Feb. 10, 1931.                G. A. BAKER                1,791,653
                               EYESHADE
                          Filed July 19, 1928
_FIG_1_
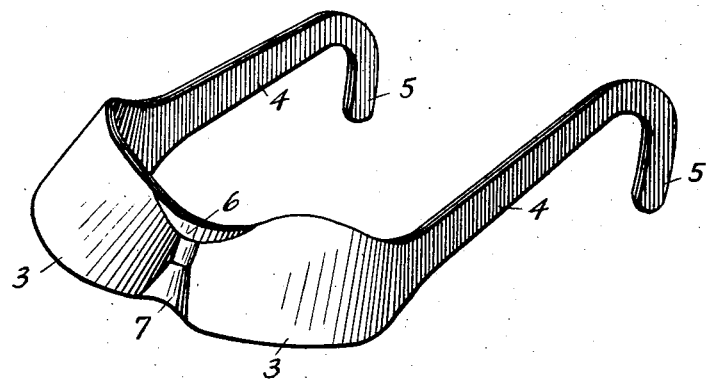
_FIG_2_
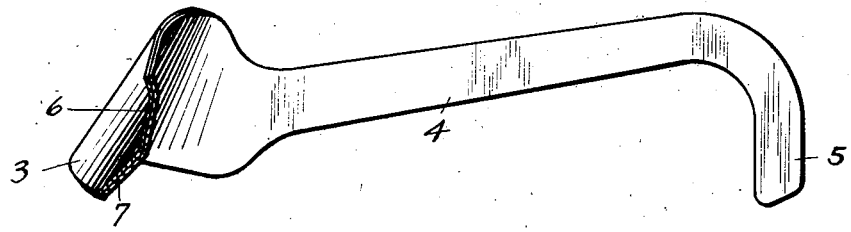
WITNESSES:                                    INVENTOR:
Gerhard Baule                               George A. Baker,
Evelyn Crompton                          BY
                                            Joshua R H Potts
                                                ATTORNEY.

Patented Feb. 10, 1931

1,791,653

UNITED STATES PATENT OFFICE

GEORGE A. BAKER, OF PHILADELPHIA, PENNSYLVANIA

EYESHADE

Application filed July 19, 1928. Serial No. 293,832.

My invention relates to eye shades and more especially to shades for protecting the eyes from light coming from above or in an approximately horizontal plane. Such shades are usually made with the upper part of the visor curved to approximately fit the temple and the lower part curved upon a larger radius, both curves being unbroken or uniform. They are usually secured to the head of the wearer by a flexible strip of some kind attached to the ends of the shade, and are usually made of readily inflammable material.

An object of the invention is to provide a visor of the above character having an improved construction.

The objects of my invention are to provide an eye shade having a visor for each eye: to provide a visor which may be made of a single piece of material including the means for holding it in position; to provide an eye shade having visors for each eye connected by a bridge including a nose piece, and to provide an eye shade of material which is practically non-inflammable.

My invention consists in the eye shade hereinafter described and claimed and shown in the accompanying drawings in which, Figure 1 is a perspective view of the eye shade, and Figure 2 a view showing one half of the two fold visor with the bow which connects it to the ear.

The eye shade is preferably made from a pasteboard blank of proper form, this requisite form being apparent from Figure 1. The blank is moistened, then bent to form a visor 3 for each eye, then rearwardly to provide side pieces 4 with downwardly bent parts 5 adapted to take behind the ear of the wearer. Parts 4 and 5 are composed of substantially plain sheets of material and the planes of both are substantially perpendicular to the same plane. The visors are integrally connected by a bridge piece 6, the lower part of which is bent outwardly to form a nose piece 7. When dried, the shade will retain the form into which it is bent. The shade is then enameled with some non-inflammable material.

The single piece shade is light, durable and non-inflammable, affords better protection to the eyes, and is more comfortable and convenient in use than the ordinary single visor shade.

It is to be understood that the above construction may be varied and changed within the scope of the invention as hereinbefore set forth and hereinafter claimed.

I claim:—

An eye shade formed of a single blank of material and cut and shaped to provide individual visors for each eye having the surfaces thereof diverging with an even slope downwardly, forwardly and laterally, side pieces integrally formed with each of said visors and extending rearwardly therefrom, said side pieces terminating in hooks adapted to take over the ears of a wearer, said visors being connected by a bridge having its lower portion flared to conform with the shape of the nose and its upper portion flared to conform to the shape of the forehead, the edge of said upper portion of the visors forming with the upper edges of the visors a substantially even curve for contact with the forehead of the wearer.

In testimony whereof I have signed my name to this specification.

GEORGE A. BAKER.